Figure 1:
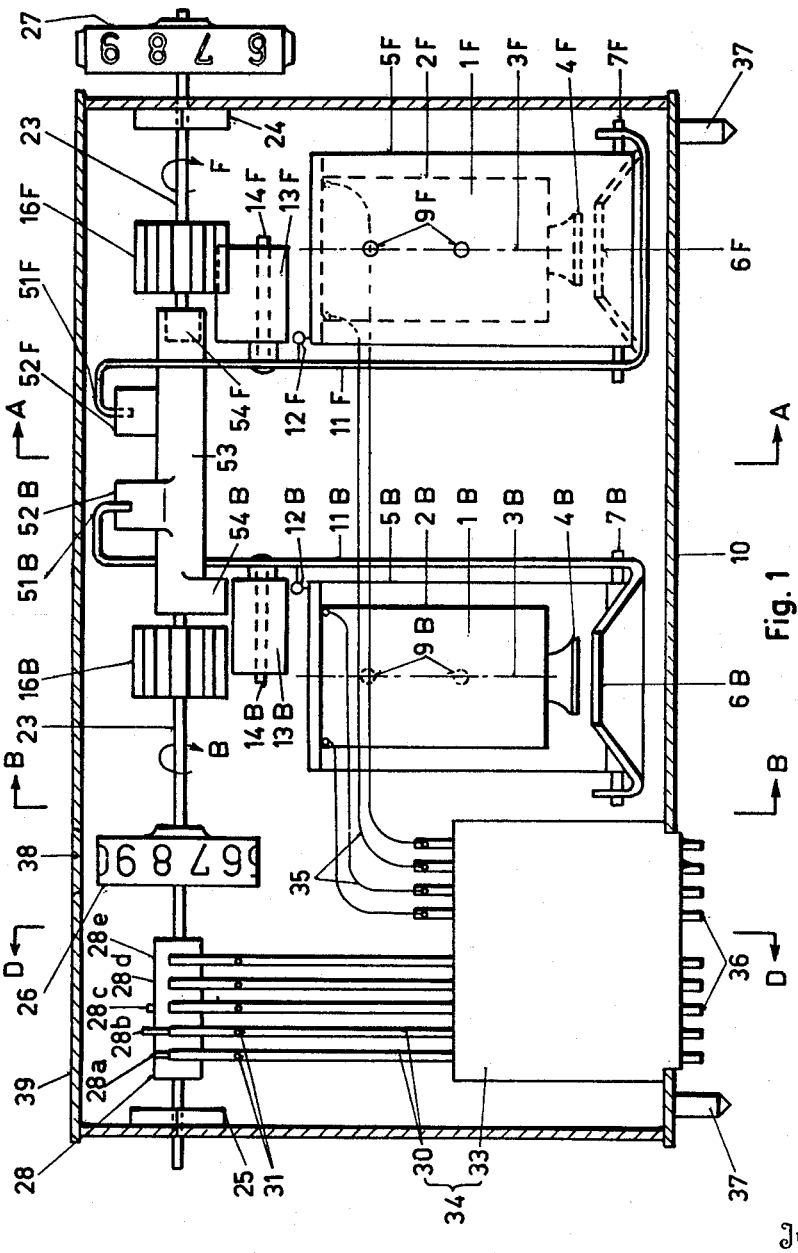

Inventor
Kurt Ehrat

Nov. 19, 1963

K. EHRAT 3,111,658

SHAFT MOUNTED ELECTRO-MAGNETIC DECADE STEPPING MECHANISM
HAVING TWO RATCHET MOTORS WITH INTERACTING STEPPING PAWL
CONTROL FOR FORWARD AND REVERSE SHAFT ROTATION

Filed Nov. 9, 1961

6 Sheets-Sheet 5

Inventor
Kurt Ehrat

By Pierce, Scheffler & Parker
Attorneys

Nov. 19, 1963  K. EHRAT  3,111,658
SHAFT MOUNTED ELECTRO-MAGNETIC DECADE STEPPING MECHANISM
HAVING TWO RATCHET MOTORS WITH INTERACTING STEPPING PAWL
CONTROL FOR FORWARD AND REVERSE SHAFT ROTATION
Filed Nov. 9, 1961  6 Sheets-Sheet 6

Inventor
Kurt Ehrat

By Pierce, Scheffler & Parker
Attorneys

United States Patent Office 3,111,658
Patented Nov. 19, 1963

3,111,658
SHAFT MOUNTED ELECTRO-MAGNETIC DECADE STEPPING MECHANISM HAVING TWO RATCHET MOTORS WITH INTERACTING STEPPING PAWL CONTROL FOR FORWARD AND REVERSE SHAFT ROTATION
Kurt Ehrat, Zurich, Switzerland, assignor to Gretag Aktiengesellschaft, Zurich, Switzerland, a Swiss firm
Filed Nov. 9, 1961, Ser. No. 151,390
Claims priority, application Switzerland Nov. 12, 1960
18 Claims. (Cl. 340—325)

This invention relates to an electro-magnetic stepping mechanism having a ratchet drive for forward and reverse running, wherein a rotor is rotatable step by step about a rotor axis, the rotor being arranged to be turned in one direction of rotation in the case of forward running by the action of a pawl on a ratchet wheel fixedly secured to the rotor, the pawl being movable to and fro by an electro-magnet and in the other direction of rotation in the case of reverse running by the action of a second pawl on a second ratchet wheel fixedly secured to the rotor, the second pawl being movable to and fro by a second electro-magnet, each electro-magnet consisting of a magnet coil, a magnet armature, an armature shaft and an armature spring. Such stepping mechanisms are known, but have various disadvantages and are suitable only for limited fields of application.

In order to be generally utilisable in counting and digital technology electro-magnetic stepping mechanisms should fulfil the following requirements:

The stepping mechanisms should be able to be disposed side-by-side so that the numerals can easily be read off together as a multi-position decimal figure from decade figure rollers fastened on the rotors in the different stepping mechanisms. The stepping mechanism must thus be narrow in the direction transversely to the figures. In addition it is required that the stepping mechanism should be able to be so shaped that the figures on the figure rollers can be printed and the printing of the figures should give an easily legible multi-position decimal figure, and further that it should be possible for the figures to be simultaneously read and printed.

In addition, it should be possible for a large number for example more than ten or more than twenty, to be of cam contacts, operated by control cams in the rotor, incorporated in the stepping mechanism, while the requirement of the above-mentioned juxtaposition of a plurality of stepping mechanisms must still be fulfilled thereby.

With the cam contacts it should be possible to produce any desired stepping programmes as a function of the rotor rotation.

In addition, with the aid of the cam contacts, it should be possible for the stepping mechanisms to be zeroised and the tens carried over, if they are grouped together to form multi-position decimal counting mechanisms.

In addition, it is desirable that the stepping mechanisms should be able to work very rapidly, for example at the rate of fifty or more steps per second, which requires that the electro-magnets should be small, that the moving parts should have a small mass, and that the rotor should have a low moment of inertia.

In addition, the mechanism permitting the forward and reverse running should be simple and inexpensive.

Finally, the force path characteristic of the electromagnets should be utilised as well as possible in the conversion of the electro-magnetic energy into the mechanical work of the rotor rotation, in order to reduce the exciter power and the heating of the electro-magnets.

Stepping mechanisms heretofore proposed have the disadvantage that they fulfill at most some of the requirements imposed, but not all of them simultaneously. Thus for example in one proposed stepping mechanism the rotor is rotated during the current conducting phase of one of the two electro-magnets through the attraction movement of the magnet armature. The disadvantages arising from this method of working are firstly poor suitability for the previously mentioned tens carry over and in addition poor utilisation of the force path characteristic of the electro-magnets. Other proposed stepping mechanisms have for example the disadvantage that the juxtaposition of a plurality of stepping mechanisms in order to form multi-position decimal figures by means of the figure rollers contained in the rotors is not possible.

In another proposed stepping mechanism, the structural solution permitting forward and reverse running is complicated and expensive.

According to the present invention there is provided an electro-magnetic stepping mechanism, comprising a rotor mounted for stepwise rotation about a rotor axis, a shaft to said rotor, a first ratchet wheel fixedly mounted on the rotor shaft, a first pawl co-operable with said first ratchet wheel to move the latter and thus said rotor in a first and forward direction of rotation, a first electromagnet, an armature to said first electro-magnet, an armature shaft on which said armature is swingable under the influence of said first electro-magnet, a second ratchet wheel also fixedly mounted on the rotor shaft, a second pawl co-operable with said second ratchet wheel to move the latter and thus said rotor in a second and reverse direction of rotation, a second electro-magnet, an armature to said second electro-magnet, an armature shaft on which said armature is swingable under the influence of said second electro-magnet, a control member movable into each of two distinct positions in each of which it renders a respective one of said pawls inoperative, first means operable by said first armature to move said first pawl into and out of engagement with said first ratchet wheel and to move said control member into one of its two distinct positions, second means operable by said second armature to move said second pawl into and out of engagement with said second ratchet wheel and to move said control member into the other of its two distinct positions, first spring means connected to said first means to return the latter to a rest position, and second spring connected to said second means to return the latter to a rest position, the arrangement being such that, when said first electro-magnet is energised, said first means is moved by said first armature so that said first pawl rides inoperatively over one tooth of said first ratchet wheel thus performing an idling stroke while the rotor remains stationary and so that said control member is moved into a first of its two positions and renders said second pawl inoperative until said second electro-magnet is energised, and the arrangement being such that, when said first electro-magnet is de-energised, the first means is moved by said first spring means to its rest position and causes said first pawl to operate said first ratchet wheel by one tooth thereby turning the rotor one step.

The rotor axis preferably lies in a plane designated as the middle plane (ME) of the stepping mechanism and the two electro-magnets are disposed beneath the rotor axis and along the latter side by side, one of the two electro-magnets being mounted in such a manner that it is turned 180° around its coil axis in relation to the other. Also the axes of the magnet coils and the armature axes preferably run parallel to the middle plane and the armature axes also run parallel to the rotor axis and the middle plane runs approximately through the centre of the electro-magnets, in such a manner that the dimension of the stepping mechanism perpendicular to the middle plane is particularly small.

Figures 2, 3:
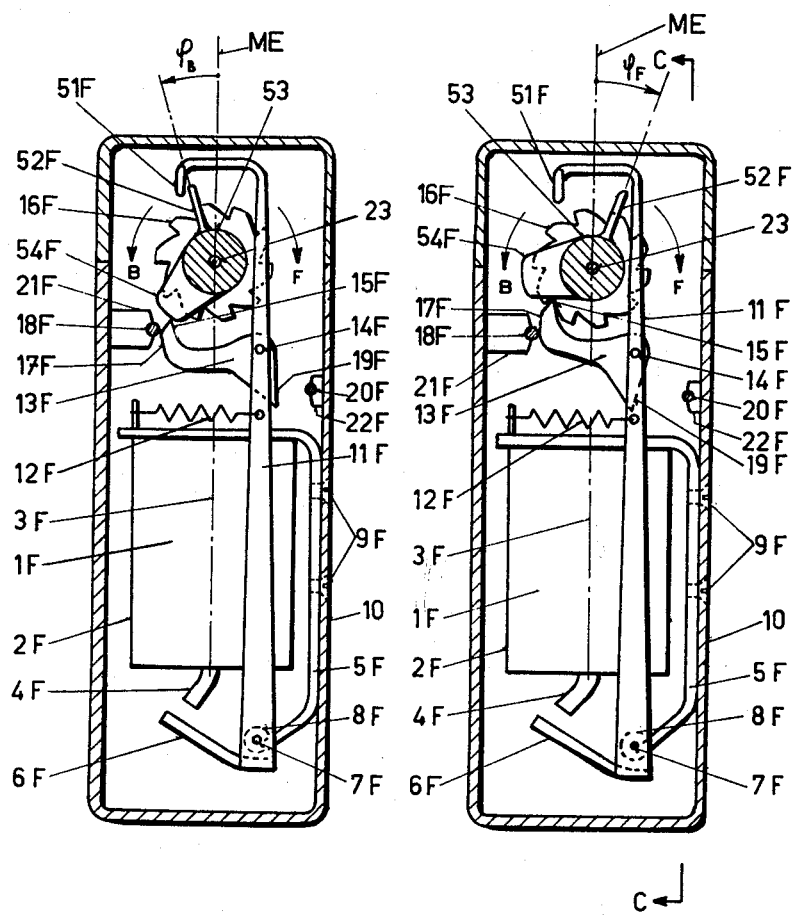
Figures 4, 7:
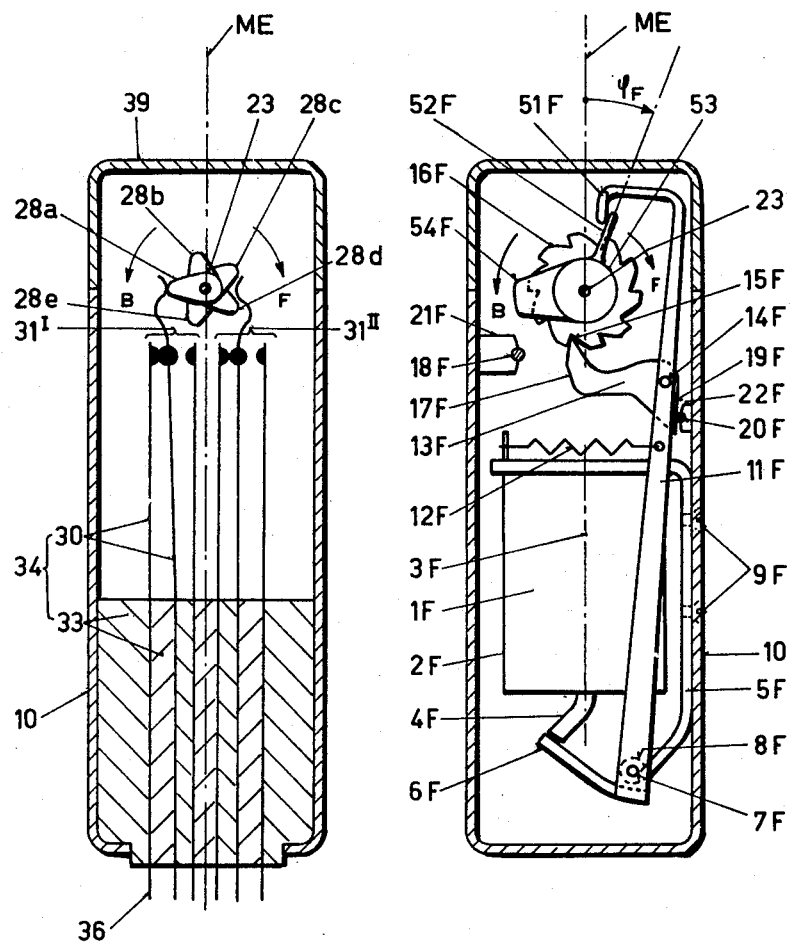
Figures 5, 6:
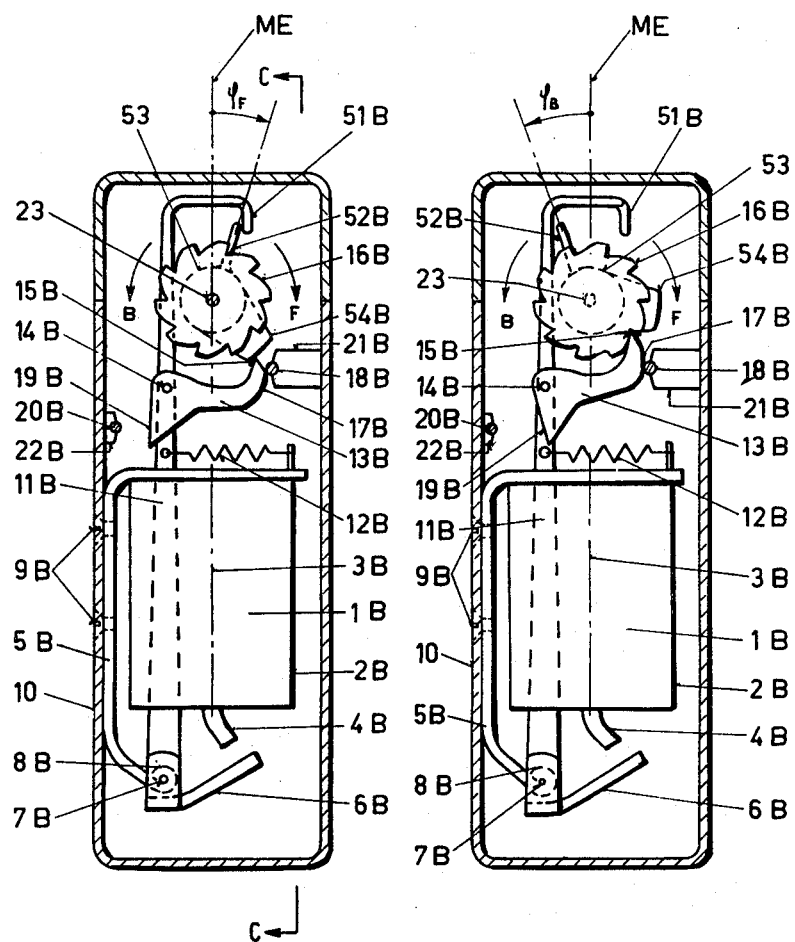
Figures 8, 9:
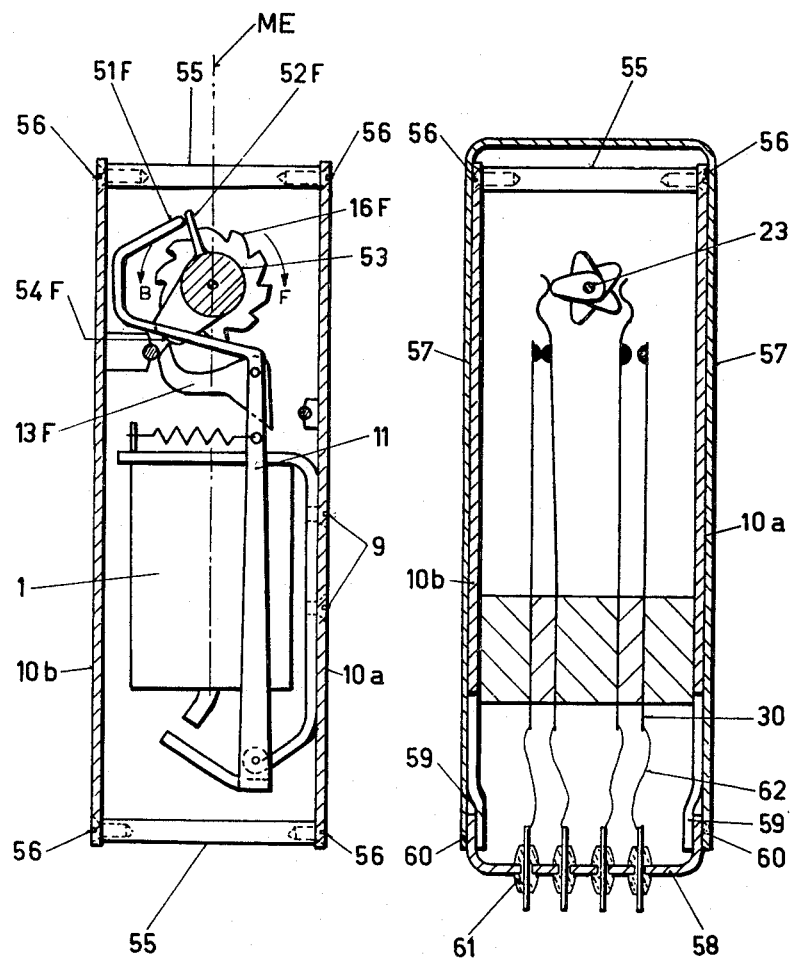
Figure 10:
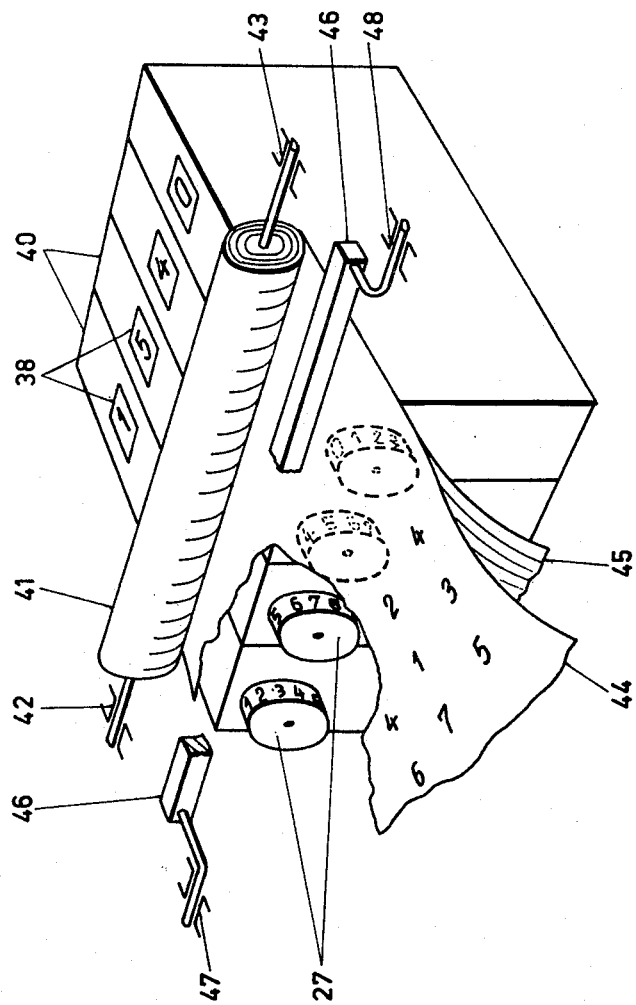

In order to enable the invention to be more readily understood, reference will now be made to the accompanying drawings, which illustrate diagrammatically and by way of example some embodiments thereof, and in which:

FIGURE 1 is a longitudinal section through one form of construction of a stepping mechanism on the line C—C in FIGURE 3 or FIGURE 5, FIGURES 2, 3 and 4 are cross-sections through the stepping mechanism, taken along the line A—A in FIGURE 1, and showing the stepping mechanism in three respective working phases, FIGURE 5 is a cross-section through the stepping mechanism taken along the line B—B in FIGURE 1 in the working phase shown in FIGURE 3, FIGURE 6 is a view similar to FIGURE 5 but showing the stepping mechanism in the working phase illustrated in FIGURE 2, FIGURE 7 is a cross-section of the stepping mechanism taken along the line D—D in FIGURE 1, FIGURE 8 is a view similar to FIGURE 2 of another form of construction of the stepping mechanism in a section perpendicular to the rotor axis and in a working phase corresponding to that shown in FIGURE 2, FIGURE 9 shows yet another form of construction of the stepping mechanism in a cross-section perpendicular to the rotor axis, and FIGURE 10 shows in perspective and in diagrammatical form the assembly of four stepping mechanisms to form a multi-place indicating and printing decimal counting mechanism.

Referring now to FIGURES 1 to 7 there is shown a stepping mechanism which includes electro-magnets 1F and 1B serving as driving elements for the stepping mechanism, the electro-magnetic 1F being arranged to drive a rotor in a forward direction (arrow F in FIGURES 1 to 7) and the electro-magnet 1B being arranged to drive the rotor in the reverse direction (arrow B in FIGURES 1 to 7).

The electro-magnet 1F consists of a magnet coil 2F, which is aligned in the direction of the coil axis 3F, a pole shoe 4F, a magnet yoke 5F, and a magnet armature 6F. The magnet armature 6F is mounted for rotation about an armature shaft 7F and the armature shaft itself is held fast by the bent-over end 8F of the magnet yoke 5F. The entire electro-magnet is held fast by two screws 9F, which connect one wall of a housing 10 of the stepping mechanism to the magnet yoke 5F. An arm 11F of the armature is fixedly secured to the armature 6F, and is acted upon by an armature spring 12F, which is arranged to impart to the armature a rotary movement opposite to the magnetic attraction force. A pawl 13F is so mounted on the arm 11F as to be rotatable about a pivot pin 14F. The pawl is acted upon by a pawl spring (not shown) which is arranged to press the point 15F of the pawl against a ten-toothed ratchet wheel 16F. The pawl has near its point a stop surface 17F by which it can bear on a stop 18F when the magnet armature has dropped.

In addition, the pawl has at its rear end a stop surface 19F by means of which it can bear on a stop 20F when the armature is attracted, the stops 18F and 20F being anchored in stop holders 21F and 22F. The upper end 51F of the armature arm is bent over and serves to operate an operating attachment 52F, which is mounted fast on a control member 53.

In the embodiment illustrated in FIGURE 2, the upper end 51F of the armature arm is bent to the right around the rotor shaft 23, and in the embodiment illustrated in FIGURE 8 the armature arm is bent to the left around the rotor shaft. This latter embodiment enables the rotor to be fitted particularly easily from above.

The electro-magnet 1B is of exactly the same construction as the electro-magnet 1F and its individual components in FIGURES 1 to 7 are indicated by the same numerals as those of the electro-magnet 1F, but with the index B.

The two electro-magnets are disposed side by side beneath the rotor shaft 23 (FIGURE 1), which runs in the middle plane ME of the stepping mechanism (FIGURES 2 and 5). The coil axes 3F and 3B lie in the middle plane ME, while the armature axles 7F and 7B run parallel to the middle plane ME.

The electro-magnet 1B is turned around its coil axis by 180° in relation to the electro-magnet 1F and is mounted in the stepping mechanism by means of screws 9B, which connect the opposite wall of the housing 10 to the magnet yoke 5B.

Through this rotation through 180° the electro-magnet 1B is suitable for driving the rotor in the other direction (B) from that in which it can be driven by the electro-magnet 1F. The middle plane runs approximately through the centre of the two electro-magnets, so that the dimension of the stepping mechanism perpendicular to the middle plane is particularly small.

Each electro-magnet is mounted in such a manner that its armature shaft and the magnetic air gap between its pole shoe and its magnet armature lies at the bottom, on the side of the electro-magnet opposite the rotor shaft. This arrangement permits the use of long armature arms 11F and 11B for the necessary path transmission from the magnetic air gaps to the pawls, without the length of the armature arms increasing to any noteworthy extent the dimensions of the stepping mechanism.

The ten-toothed ratchet wheel 16F is so constructed that it is turned (FIGURE 3) by the action of the pawl 13F in the forward direction (F) while the ten-toothed ratchet wheel 13B is so constructed that it is turned (FIGURE 6) in the reverse direction (B) by the action of the pawl 13B. The two ratchet wheels are mounted fast on the rotor shaft 23, which is mounted rotatably in the bearings 24 and 25, and on which are mounted, in addition to the two ratchet wheels, an indicator figure roller 26, a printing figure roller 27, and also control cams 28 for operating contact springs 30 of cam contacts 31.

The rotor shaft 23, ratchet wheels 16F and 16B, figure rollers 26 and 27, and control cams 29 together form the rotor. The control member 53 is mounted rotatably on the rotor shaft 23, between the two ratchet wheels, and serves to bring the pawl of the electro-magnet which is not working at any given moment out of engagement with the ratchet wheel allocated to it and to hold it out of engagement, in order not to prevent the rotation of the rotor in the direction of rotation corresponding to the electro-magnet which is working. The control member is controlled by the ends 51F and 51B respectively of the armature arms, which act respectively on the operating attachments 52F and 52B, and turn the control member in each case into one of two discrete angular positions designated by $\varphi F$ and $\varphi B$. Operating cams 54F and 54B are anchored on the control member, while by rotation of the control member in the direction of rotation F into the angular position $\varphi F$ the pawl 13B is brought out of engagement with the ratchet wheel 16B, and by rotation of the control member in the direction of rotation B into the angular position $\varphi B$ the pawl 13F is brought out of engagement with the ratchet wheel 16F.

The mounting of the control member on the rotor shaft makes it unnecessary to provide an additional mounting point and permits the control of the engagement of the pawl points without stringent requirements as to accuracy of dimensions.

The embodiments illustrated in FIGURES 1 to 7 and in FIGURE 8, in which the pawls 13F and 13B respectively are in engagement with the ratchet wheels beneath the rotor shaft 23 and the ends 51F and 51B respectively project up to a point above the rotor shaft and the operating attachments 52F and 52B respectively are disposed above and the operating cams 54F and 54B respectively below the rotor shaft on the control member are particularly favourable because the rotor axis can easily be fitted and removed from above.

The pawls could however also be mounted on the armature arms so as to engage with the ratchet wheels above the rotor shaft, in which case the operating attachments must be disposed below the rotor shaft and also be operated by the armature arms below the rotor axle shaft and the operating cams be disposed above the rotor shaft on the control member.

For the explanation of the mode of operation of the drive of the stepping mechanism, reference will first be made to the position of the stepping mechanism illustrated in FIGURES 2 and 6. The two electro-magnets 1F and 1B are without current, the two magnet armatures 6F and 6B have dropped, and the control member 53 is situated in the angular position φB. In this position the pawl point 15F of the pawl 13F has been pushed downwards and out of engagement with the ratchet wheel 16F by the operating cam 54F (FIGURE 2). On the other hand, in the same angular position (ψB) of the control member 53 the pawl 13B is in engagement with the ratchet wheel 16B (FIGURE 6) since the operating cam 54B leaves the point 15B of the pawl 13B free. In this angular position ψB of the control member, the stepping mechanism is thus adjusted for reverse running (direction of the arrow B).

The electro-magnet 1F is now energised and the armature 6F is thereby attracted by the pole shoe 4F and rotates about the armature shaft 7F.

Through this attraction movement of the armature 6F, the armature arm 11F moves to the right in FIGURE 2, whereby the pawl 13F is likewise moved to the right and the armature spring 12F is stressed. The pawl point slides inoperatively, that is to say without moving the ratchet wheel and rotor, over one tooth of the ratchet wheel 16F. During the attraction movement of the magnet armature the pawl thus performs the idling stroke. During the attraction movement, moreover, the end 51F of the armature arm presses on the operating attachment 52F of the control member and moves it to the right. The control member 53 is thus turned in the direction of the arrow F out of the angular position φB into the angular position ψF. The condition at the end of the attraction movement is illustrated in FIGURE 4. The magnet armature is entirely attracted, the armature arm has been rocked entirely to the right and the control member has entirely assumed the angular position ψF.

The stop surface 19F at the rear end of the pawl strikes against the stop 20F, whereby there is produced about the axis of the pawl 14F a turning moment which presses the pawl point against the ratchet wheel after it has slipped inoperatively over one tooth of the ratchet wheel 16F. This turning moment effects a rapid insertion of the pawl point into the next tooth gap of the ratchet wheel and contributes towards the rapid working of the stepping mechanism.

In consequence of the turning of the control member 53 during the attraction movement from the angular position ψB into the angular position ψF, moreover, the pawl 13B of the electro-magnet 1B which is not energised is brought out of engagement with the appertaining ratchet wheel 16B, as can be easily seen from FIGURES 6 and 5. Since the electro-magnet 1B is not energised, its magnet armature 6B and its armature arm 11B remain at rest.

As mentioned, before the commencement of the current conducting phase of the electro-magnet 1F, the electro-magnet 1B and its pawl 13B and the control member 53 were in the position illustrated in FIGURE 6. Through the rocking of the control member from the angular position ψB (FIGURE 6) into the angular position ψF (FIGURE 5), effected by the electro-magnet 1F, the point 15B of the pawl 13B is pressed downwards by the cam 54B and held in that position, as can be seen in FIGURE 5. The pawl 13B is thus out of engagement with the ratchet wheel 16B and the rotor is free for rotation in the forward direction F.

Through the interruption of the energising current of the working electro-magnet 1F, the currentless phase is initiated. Through the elimination of the magnetic attraction force, the magnet armature 6F will drop out of the attracted position shown in FIGURE 4 and the stressed armature spring 12F will move the armature arm 11F to the left. The pawl 13F mounted in the armature arm then likewise moves to the left and turns the ratchet wheel 16F by one tooth division and hence the rotor by one tenth of a rotation in the forward direction F. The pawl has thus performed the working stroke during the dropping movement of the magnet armature of the electro-magnet 1F. At the end of the dropping movement, the stop surface 17F at the point end of the pawl 13F strikes against the stop 18F (FIGURE 3) whereby the point of the pawl is pressed against the ratchet wheel and overruning of the rotor is avoided. The control member 53 is not operated during the dropping movement and remains in the angular position ψF assumed in FIGURE 4. At the end of the dropping movement the stepping mechanism is situated in the position illustrated in FIGURE 3 and FIGURE 5. On the further pulse excitation of the same electro-magnet 1F, the rotor will perform for each pulse a further rotation of step of one tenth of a revolution in the forward direction F. The armature arm 11F and the pawl 13F will at the same time always move to and fro between the end positions illustrated in FIGURE 3 and FIGURE 4. The control member 53 at the same time always remains at rest in the position ψF and holds the pawl 13B of the electro-magnet 1B, which is not working, continuously out of engagement with its respective ratchet wheel 16B.

However, as can be seen in FIGURE 5, if the electro-magnet 1B is energised, then, through the first attraction movement of the magnet armature 6B, the control member 53 is moved by the end 31B of the armature arm 11B from the angular position ψF into the angular position ψB, whereby the pawl 13F of the electro-magnet 1F which is now not working is brought out of engagement with the respective ratchet wheel 16F (FIGURE 2). The rotor is now free for the rotational movement in the reverse direction B. In other respects, the mode of operation when the electro-magnet 1B is working, with the exception of the altered direction of rotation of the rotor, is exactly the same as when the electro-magnet 1F is working. It can easily be seen that with pulse energisation of one or the other electro-magnet, the rotor performs per impulse one tenth of a revolution in one or the other direction, and the stepping mechanism is suitable as a pulse counting mechanism for forward and reverse counting.

The steepness of the force path characteristic of the armature springs is advantageously adjusted to the steepness of the force path characteristic of the magnet armature, that is to say when the magnet armature has dropped, the spring force of the armature springs should be small and when the magnet armature is attracted it should be great. The response power of the electro-magnets is thereby reduced and the stepping speed increased. In addition, owing to the fact that when the magnet armature is dropped the spring power of the armature spring is small, the static pressure of the pawl on the stops 18F or 18B, resulting from the armature spring, is likewise small and the pressing of the pawls out of engagement with the ratchet wheels on the alteration of the direction of rotation of the rotor needs little force.

The stops 18 and 20 can be constructed as shock absorbers, whereby the armature movement is achieved practically without rebound, and the impact forces are reduced, so that less wear and long life are achieved even with great stepping frequency. The stops in this case consist of a container of a thin-walled deformable material in which fine granular sand or pulverulent material is hermetically enclosed, the shocks of the pawl being damped by the internal friction in the material.

The indicator figure roller 26 (FIGURE 1) carries the ten decimal figures on the periphery of the roller, and of these figures one is always visible through an inspection aperture 38 of a cover 39 of the stepping mechanism.

On its periphery, the printing figure roller 27 likewise carries the ten decimal figures, which in order to be suitable for printing are raised on the roller surface.

The figures of both figure rollers are aligned in the direction of the axis of the rotor. The juxtaposition of a plurality of stepping mechanisms in the direction of the smallest dimensions of the stepping mechanisms, that is to say perpendicularly to the middle planes, for the purpose of forming multi-place decimal figures, is thus possible as indicated in FIGURE 10 (see infra).

The alignment of the figures transversely to the peripheral direction of the figure rollers also enables the diameters of the rollers to be made small and the stepping speed of the stepping mechanism to be increased.

The rotor of the stepping mechanism can consist of a rotatable metal wire shaft, on which ratchet wheels, figure rollers, and control cams are for example fixed by moulding around them. The ratchet wheels, figure rollers, and control cams then advantageously consist of synthetic plastic or resin material and have a small diameter, in order to keep the moment of inertia of the rotor small and to permit high stepping frequencies. In order to enable the assembled rotor to be easily mounted, the bearings 24 and 25 are of two-part construction.

The cam contacts operated by the control cams 28 serve to produce stepping programmes in dependence upon the rotation of the rotor. In order to keep the dimension of the stepping mechanism perpendicular to the middle plane small, the contact springs 30 of the cam contacts are so disposed as to run near the middle plane ME and parallel thereto, and also parallel to the coil axes 3F and 3B of the electro-magnets (FIGURES 1 and 7). A larger number of cam contacts can be disposed along the rotor axis, without increasing the dimension of the stepping mechanism perpendicularly to the middle plane, and without the moment of inertia of the rotor being substantially increased by an increase in the number of the control cams.

For the use of the stepping mechanism in multi-place adding and subtracting pulse counting mechanisms, cam contacts are for example required for the zeroising, which for example disconnect in the "zero" position of the rotor, and also for the tens carry-over cam contacts which in the position 9 in the case of forward running or "0" in the case of reverse running will close. For the tens carry-over it is then particularly advantageous that the rotor advance takes place in the currentless phase of the electro-magnets.

Other frequently used stepping programmes are those in which each of the ten peripheral positions of the rotor is marked by a special cam contact or by a special cam contact combination. Such stepping programmes can for example be used for the remote transmission of the rotor position.

In FIGURES 1 and 7 there is shown as an example a cam contact arrangement in which in each of the ten peripheral positions of the rotor one of ten cam contacts 31 is operated by control cams. Of these ten cam contacts 31, which together form a cam contact decade, each two in each case lie opposite one another as cam contact pairs $31^I$ and $31^{II}$ (FIGURE 7) symmetrically to the middle plane ME, and then two cam contacts of a pair are operated by the same control cam 28, but the cam contact $31^{II}$ is operated five steps later than the cam contact $31^I$. On the rotor there are five control cams $28a$ to $28e$, each of the five control cams operating one of the five cam contact pairs ($31^I$, $31^{II}$). Each of the five control cams is turned by 72° from the next following cam, so that in each of the ten possible angular positions of the rotor, one of the ten cam contacts is operated. Since only five control cams are needed to operate the ten cam contacts, the moment of inertia of the control cams is kept small and the stepping speed of the stepping mechanism is increased. The symmetrical arrangement of the cam contacts of the five pairs in relation to the middle plane enables the dimensions of the stepping mechanism perpendicularly to the middle plane to be kept small.

The contact springs are insulated from one another in the usual manner by insulations 33, and the contact springs and insulations are for example united by adhesion to form a contact spring packet 34. Connections 35 of the magnet coils 2B and 2F are likewise introduced into the contact spring packet. The bottom ends 36 of the contact springs project out of the stepping mechanism and serve at the same time as plug pins, while pins 37 (FIGURE 1) serve as guide pins, so that the stepping mechanism can be plugged in.

In order to achieve high stepping speeds, the rotor must not only have a small moment of inertia, but the electro-magnets must also be small, although their exciter power must be made relatively great.

Good thermal contact of the electro-magnets with the housing wall 10, and good removal of heat from the housing to a mounting frame prevent impermissible heating. The form of the housing of the stepping mechanism is not restricted to that illustrated in FIGURES 1 to 7.

In the embodiment illustrated in FIGURE 8, the stepping mechanism is mounted between two mounting plates $10a$ and $10b$ which are parallel to the middle plane ME and which are held together by spacing supports 55 secured with screws 56. This embodiment is suitable for mounting the stepping mechanisms in appliances where individual housings are not required.

In FIGURE 9, a hermetically sealable form of construction of the stepping mechanism is illustrated in a section at right angles to the rotor axis in the region of the cam contacts. Similarly to the embodiment illustrated in FIGURE 8, the stepping mechanism is mounted between two mounting plates $10a$ and $10b$, which for example are held together by spacing supports 55 secured with screws 56.

The bottom 58 is fixed on extensions 59 of the mounting plates, for example by spot welding, and carries hermetically closed conductor lead-ins 61, which are connected by means of connection 62 to the contact springs 30 and to the connections (not shown) of the electro-magnets. By connecting, for example by soldering, the lid and bottom at the bottom edge 60, the stepping mechanism can be hermetically closed so that it can be filled with an inert gas.

FIGURE 10 shows how a four-place figure which appears in the viewing apertures 38 and which is formed by four juxtaposed individual stepping mechanisms 40 can be read. In addition it is shown in a rather diagrammatic manner how the printing of a four-place figure can be effected. A paper roll 41 is rotatably mounted in bearings 42 and 43 and consists of a roll of semi-transparent paper 44 and carbon paper 45. A printing hammer 46 which can be pressed against the printing figure rollers 27 is rotatably mounted in bearings 47 and 48. The paper of the paper roll 41 runs under the printing hammer but over the printing figure rollers 27, so that by operation of the printing hammer the four-place figure appearing on the four printing figure rollers can be printed with the aid of the carbon paper 45 on the paper 44.

Having thus described the invention, what is claimed as new and desired to be secured by Letters Patent is:

1. An electro-magnetic stepping mechanism, comprising a rotor mounted for stepwise rotation about a rotor axis, a shaft to said rotor, a first ratchet wheel fixedly mounted on the rotor shaft, a first pawl co-operable with said first ratchet wheel to move the latter and thus said rotor in a first and forward direction of rotation, a first electro-magnet, an armature to said first electro-magnet, an armature shaft on which said armature is swingable under the influence of said first electro-magnet, a second ratchet wheel also fixedly mounted on the rotor shaft, a second pawl co-operable with said second ratchet wheel to move the latter and thus said rotor in a second and reverse direction of rotation, a second electro-magnet, an armature to said second electro-magnet, an armature shaft on which said armature is swingable under the influence of said second electro-magnet, a control member movable into each of two distinct positions in each of which it renders a respective one of said pawls inoperative, first means operable by said first armature to move said first pawl into and out of engagement with said first ratchet wheel and to move said control member into one of its two distinct positions, second means operable by said second armature to move said second pawl into and out of engagement with said second ratchet wheel and to move said control member into the other of its two distinct positions, first spring means connected to said first means to return the latter to a rest position, and second spring connected to said second means to return the latter to a rest position, the arrangement being such that, when said first electro-magnet is energised, said first means is moved by said first armature so that said first pawl rides inoperatively over one tooth of said first ratchet wheel thus performing an idling stroke while the rotor remains stationary and so that said control member is moved into a first of its two positions and renders said second pawl inoperative until said second electro-magnet is energised, and the arrangement being such that, when said first electro-magnet is de-energised, the first means is moved by said first spring means to its rest position and causes said first pawl to operate said first ratchet wheel by one tooth thereby turning the rotor one step.

2. The mechanism of claim 1, wherein the axis of the rotor lies in a plane designated as the middle plane of the stepping mechanism and the two electro-magnets are disposed beneath the rotor axis and along the latter side by side, one of the two electro-magnets being mounted in such a manner that it is turned 180° around its coil axis in relation to the other, and wherein the axes of the magnet coils and also the armature shafts run parallel to the middle plane and the armature shafts also run parallel to the rotor axis while the middle plane runs approximately through the centre of the electro-magnets, in such a manner that the dimension of the stepping mechanism perpendicularly to the middle plane is particularly small.

3. The mechanism of claim 1, wherein said rotor comprises at least one decade figure roller, the peripheral figures of which are aligned parallel to the axis of the rotor, at least one control cam for the operation of contact springs of cam contacts, and also the two ratchet wheels.

4. The mechanism of claim 1, wherein the rotor axis is disposed on the side of the electro-magnets opposite the armature shafts.

5. An electro-magnetic stepping mechanism, comprising a rotor mounted for stepwise rotation about a rotor axis, a shaft to said rotor, a first ratchet wheel fixedly mounted on the rotor shaft, a first pawl co-operable with said first ratchet wheel to move the latter and thus said rotor in a first and forward direction of rotation, a first electro-magnet, an armature to said first electro-magnet, an armature shaft on which said armature is swingable under the influence of said first electro-magnet, a second ratchet wheel also fixedly mounted on the rotor shaft, a second pawl co-operable with said second ratchet wheel to move the latter and thus said rotor in a second and reverse direction of rotation, a second electro-magnet, an armature to said second electro-magnet, an armature shaft on which said armature is swingable under the influence of said second electro-magnet, a control member mounted on said rotor shaft between the two ratchet wheels and movable into each of two distinct positions, a first operating cam on said control member for rendering said first pawl inoperative when said control member is in the first of its two positions, a second operating cam on said control member for rendering said second pawl inoperative when said control member is in the second of its two positions, a first armature arm having said first pawl mounted on it and operable by said first armature to move said first pawl into and out of engagement with said first ratchet wheel, a first operating attachment to said control member and co-operable with said armature arm to be moved by the latter to move said control member into its second position, first spring means urging said first armature arm into its rest position, a second armature arm having said second pawl mounted on it and operable by said second armature to move said second pawl into and out of engagement with said first ratchet wheel, a second operating attachment to said control member and co-operable with said armature arm to be moved by the latter to move said control member into its first position, second spring means urging said second armature arm into its rest position, and, mounted on the rotor shaft, at least one decade figure roller, the peripheral figures of which are aligned parallel to the axis of the rotor.

6. A mechanism of claim 5, wherein the operating cams of the control member are disposed beneath the rotor axis and the operating attachments of the control member are disposed above the rotor axis, and wherein the pawls mounted on the armature arms are in engagement with the ratchet wheels beneath the rotor axis and the ends of the armature arms which press on the operating attachments project up to a point up above the rotor axis.

7. The mechanism of claim 5, and further comprising an apertured housing, and an indicating figure roller, the figures of which are visible one-by-one through an aperture in said housing.

8. The mechanism of claim 5, wherein at least one of said figure rollers is a printing roller carrying figures in relief.

9. The mechanism of claim 5, wherein said rotor shaft is of metal wire and is rotatable in bearings therefor, and wherein said ratchet wheels, figure rollers, control member and cams, and bearings are made of synthetic plastic material having low specific gravity and have a small diameter.

10. The mechanism of claim 9, wherein said bearings are of two-part construction.

11. The mechanism of claim 5, wherein the steepness of the force path characteristic of each spring means is adapted to the steepness of the force path characteristics of its associated armature, so that when the armature is dropped the spring force of the spring means is small and when the magnet armature is attracted the spring force is great.

12. An electro-magnetic stepping mechanism, comprising a rotor mounted for stepwise rotation about a rotor axis, a shaft to said rotor, a first ratchet wheel fixedly mounted on the rotor shaft, a first pawl co-operable with said first ratchet wheel to move the latter and thus said rotor in a first and forward direction of rotation, a first electro-magnet, an armature to said first electro-magnet, an armature shaft on which said armature is swingable under the influence of said first electro-magnet, a second ratchet wheel also fixedly mounted on the rotor shaft, a second pawl co-operable with said second ratchet wheel to move the latter and thus said rotor in a second and reverse direction of rotation, a second electro-magnet, an armature to said second electro-magnet, an armature shaft on which said armature is swingable under the influence of said second electro-magnet, a control member mounted on said rotor shaft between the two ratchet wheels and movable into each of two distinct positions, a first operating cam on said control member for rendering said first pawl inoperative when said control member is in the first of its two positions, a second operating cam on said control member for rendering said second pawl inoperative when said control member is in the second of its two positions, a first armature arm having said first pawl mounted on it and operable by said first armature to move said first pawl into and out of engagement with said first ratchet wheel, a first operating attachment to said control member and co-operable with said armature arm to be moved by the latter to move said control member into its second position, first spring means urging said first armature arm into its rest position, a second armature arm having said second pawl mounted on it and operable by said second armature to move said second pawl into and out of engagement with said first ratchet wheel, a second operating attachment to said control member and co-operable with said second armature arm to be moved by the latter to move said control member into its first position, second spring means urging said second armature arm into its rest position, first and second stop means for limiting the strokes of said pawls, an apertured housing for said mechanism, and at least one decade figure roller mounted on said rotor shaft, at least one of said decade figure rollers being an indicating figure roller of which the peripheral figures are aligned parallel to the axis of the rotor and are visible one-by-one through an aperture in said housing.

13. The mechanism of claim 12, wherein said first and second stop means are provided for limiting the working strokes of the pawls.

14. The mechanism of claim 12, wherein said first and second stop means are provided for limiting the idling strokes of said pawls.

15. The mechanism of claim 12, wherein said stop means are constructed as shock absorbers and consist of fine-grained pulverulent material enclosed in hermetically sealed containers of thin-walled deformable material.

16. An electro-magnetic stepping mechanism, comprising a rotor mounted for stepwise rotation about a rotor axis, a shaft to said rotor, a first ratchet wheel fixedly mounted on the rotor shaft, a first pawl co-operable with said first ratchet wheel to move the latter and thus said rotor in a first and forward direction of rotation, a first electro-magnet, an armature to said first electro-magnet, an armature shaft on which said armature is swingable under the influence of said first electro-magnet, a second ratchet wheel also fixedly mounted on the rotor shaft, a second pawl co-operable with said second ratchet wheel to move the latter and thus said rotor in a second and reverse direction of rotation, a second electro-magnet, an armature to said second electro-magnet, an armature shaft on which said armature is swingable under the influence of said second electro-magnet, a control member mounted on said rotor shaft between the two ratchet wheels and movable into each of two distinct positions, a first operating cam on said control member for rendering said first pawl inoperative when said control member is in the first of its two positions, a second operating cam on said control member for rendering said second pawl inoperative when said control member is in the second of its two positions, a first armature arm having said first pawl mounted on it and operable by said first armature to move said first pawl into and out of engagement with said first ratchet wheel, a first operating attachment to said control member and co-operable with said armature arm to be moved by the latter to move said control member into its second position, first spring means urging said first armature arm into its rest position, a second armature arm having said second pawl mounted on it and operable by said second armature to move said second pawl into and out of engagement with said first ratchet wheel, a second operating attachment to said control member and co-operable with said armature arm to be moved by the latter to move said control member into its first position, second spring means urging said second armature arm into its rest position, a plurality of control cams mounted on said rotor shaft, a multiplicity of cam springs associated with said control cams and lying near the middle plane of said mechanism, a multiplicity of cam contacts carried by said springs, an apertured housing for said mechanism, and at least one decade figure roller mounted on said rotor shaft, at least one of said decade figure rollers being an indicating figure roller of which the peripheral figures are aligned parallel to the axis of the rotor and are visible one-by-one through an aperture in said housing.

17. The mechanism of claim 16, wherein the stepping mechanism contains at least one cam contact decade, while of ten cam contacts each two lie opposite one another symmetrically to the middle plane as a cam contact pair and are operated by the same control cam, one cam contact, however, being operated five steps later than the other, and for each of the five cam contact pairs which lie side by side on the rotor axis one control cam in each case is provided on the rotor axis and the five control cams are offset in relation to one another by 36° or multiples of 36°, so that in ten successive steps of the rotor each of the ten contact pairs of the cam contact decade is operated once.

18. The mechanism of claim 16, wherein the dimension of the stepping mechanism perpendicular to its width, is substantially smaller than the dimensions in the direction of the axes of the electro-magnets and in the direction of the axis of the rotor.

No references cited.